United States Patent [19]

Borovoy et al.

[11] Patent Number: 5,537,529
[45] Date of Patent: Jul. 16, 1996

[54] APPARATUS AND METHOD FOR CREATING VERSIONS OF COMPUTER MODELS AND CREATING COMMUNICATIONS INCORPORATING CREATED VERSIONS THEREFROM

[75] Inventors: Richard D. Borovoy, Palo Alto; Eric B. W. Cooper, Soquel, both of Calif.

[73] Assignee: Apple Computer, Inc., Cupertino, Calif.

[21] Appl. No.: 51,531

[22] Filed: Apr. 22, 1993

[51] Int. Cl.$^6$ .................................................. G06F 3/14
[52] U.S. Cl. .................. 395/155; 395/154; 395/162; 395/600; 395/775; 348/699; 364/DIG. 1; 364/282.1; 364/225.6; 364/232.21
[58] Field of Search .................. 395/600, 155, 395/154, 162, 775; 364/DIG. 1, DIG. 2; 348/699

[56] References Cited

U.S. PATENT DOCUMENTS

| | | | |
|---|---|---|---|
| 4,195,178 | 3/1993 | Krieger et al. | 395/157 |
| 4,645,459 | 2/1987 | Graf et al. | 434/43 |
| 4,703,350 | 10/1987 | Hinman | 358/133 |
| 4,811,112 | 3/1989 | Rutledge | 358/260 |
| 4,879,667 | 11/1989 | Gorski et al. | 364/522 |
| 4,890,160 | 12/1989 | Thomas | 358/105 |
| 5,010,500 | 4/1991 | Makkuni et al. | 395/155 |
| 5,019,961 | 5/1991 | Addesso et al. | 362/192 |
| 5,121,202 | 6/1992 | Tanoi | 358/136 |
| 5,193,183 | 3/1993 | Bachman | 395/600 |
| 5,241,645 | 8/1993 | Cimral et al. | 395/500 |
| 5,272,529 | 12/1993 | Frederiksen | 358/133 |
| 5,274,758 | 12/1993 | Bradley et al. | 395/154 |
| 5,276,877 | 1/1994 | Friedrich et al. | 395/650 |
| 5,325,533 | 6/1994 | McInerney et al. | 395/700 |
| 5,351,095 | 9/1994 | Kerdran Vat | 348/699 |
| 5,422,989 | 6/1995 | Bell et al. | 395/133 |

Primary Examiner—Thomas G. Black
Assistant Examiner—Jean R. Homere
Attorney, Agent, or Firm—Blakely, Sokoloff, Taylor & Zafman

[57] ABSTRACT

A method and apparatus for providing communication in a computer system. The present invention includes a method and apparatus for modifying a first version of a computer model in a live environment to create additional versions. The present invention also includes a method and apparatus for storing the additional versions and a method and apparatus for accessing each of the additional version, independent of the other additional versions, in order to create a temporal sequence.

26 Claims, 11 Drawing Sheets

APPARATUS AND METHOD FOR CREATING
VERSIONS OF COMPUTER MODELS AND
CREATING COMMUNICATIONS
INCORPORATING CREATED VERSIONS
THEREFROM

FIELD OF THE INVENTION

The present invention relates to the field of computer systems; particularly, the present invention relates to the field of using computer models as communication devices.

BACKGROUND OF THE INVENTION

Today, computer systems have become increasingly powerful. Because of the increased capabilities of these computer systems, the number of computer applications available to be run on these computer systems has increased as well. Examples of these computer applications includes spreadsheet programs, simulation programs, and 3-D modeling programs. These applications operate on computer models, such as spreadsheets, simulations, data sets, and 3-D models.

Applications, in conjunction with the computer models on which they operate, often communicate information by the results they produce. In other words, a graphing application may produce a graph which conveys information to the viewer. Even so, if multiple versions of a computer model (e.g., multiple graphs) are placed in a sequence for the viewer, the multiple versions presented collectively form an "unfolding" communication. Thus, by stringing together multiple versions of a computer model into a series, the information represented in the versions may be presented in much of the same way as a story is told. This type of communication is often very effective.

One of the limitations of these computer models is that multiple different versions of a particular computer model cannot be sequenced together in the modeling environment to create a communication. Therefore, to use a sequence of different versions in a communication, the computer models must be removed from the application environment in which they were created. This causes these models to be static. For instance, once a picture file (pict. file) is removed from its graphing environment and embedded in a word processing document, the graph of the picture file may not be explore or extended. Thus, once the computer models are removed from their application environment, they are no longer in a live environment in which computer models may be explored or extended. It is desirable to be able to use computer models in a communications environment, such that they may be explored or extended (i.e., such that they are in a live environment).

In the prior art, methods and mechanisms with limited abilities do exist which permit a user viewing the results to determine the sequence of steps taken over time with respect to a computer model to arrive at the final result. Most notably, screen recording and macro recording have been used to record temporal sequences.

Screen recording is a method of recording the sequence of "screen shots" directly from the computer display. When turned on by the user, the screen recorder records the data image off the screen. For instance, if a person has a screen recorder on when interacting with a spreadsheet, the sequence of interactions and intermediate results made by the person when working on the spreadsheet would be recorded. Once a screen recording has been made, the sequence becomes completely separated from the live environment in which it was produced. In fact, the environment in which it was created (i.e., the spreadsheet application) is not used to play back the sequence so the sequence is not explorable or is not extensible by the recipient. Thus, a screen recording is no more than a recording of data images off the screen. It would be desirable to allow the interactions with a computer model to be recorded so that they may be played back and explored by another.

Macros, on the other hand, work in a live environment. A macro can be used to directly record a user's actions on a given document. In other words, a macro records the actions a user takes to change a document from state N-1 to state N. An example of such an action could be the deletion of a paragraph in a word processing document. One problem with macros is that they are highly context dependent since the version on which each macro operates is the version which precedes it in time. If a sequence of macros were recorded sequentially, each of the macros will play back correctly only if executed when the document starts in state N and all of the macros are executed in the order they were created. If one or more of the macros is eliminated or their temporal order changed, play back can be inaccurate. Therefore, although macros work in a live environment, if the macros are played back incorrectly, then a meaningful result will not be produced.

Another problem with macros is that if a particular result is achieved while operating with a computer model, in order to use a sequence of macros to generate or arrive at that particular result, then the author would have to, in effect, recreate the result with the macro record on (i.e., perform the same steps over again). Thus, the user does not have the benefit of accessing the work already performed. It is desirable to be capable of recording the interactions of the user with a computer model, such that the steps taken to arrive at the result do not have to be recreated after a desired result has been achieved.

Another method of recording the temporal sequence of interactions taken in producing a document is to save entire versions of documents whenever a change occurs. One of the problems associated with such an approach is that to load and create each of the versions is a very time intensive operation when the documents are large. Furthermore, saving entire versions of documents requires very large amounts of disk space. Therefore, saving whole versions of documents limits the time and space efficiency. Thus, it is desirable to allow the temporal sequence of interactions with a computer model to be recorded such that the time and memory space required to explore the temporal sequence is reduced.

The present invention provides a method and apparatus for the recording of a user's interactions with a computer model into temporal sequences. The present invention also allows the user the ability to record, playback, and explore temporal sequences in a live environment. In this manner, the computer system is able to provide model based communication.

SUMMARY OF THE INVENTION

A method and apparatus for providing communication based on a computer model is described. The present invention includes a method and means for modifying a first version of a computer model to create additional versions. The present invention also includes a method and apparatus for storing the additional versions. In one embodiment, each of the additional versions is stored as a vector. Each vector comprises the difference between each of the additional versions and the first version. In this manner, multiple vectors are created, all of which are context independent. By being context independent, each of the vectors may be accessed independent of the other of the multiple vectors.

The present invention also includes a method and apparatus for providing communication in a computer system. The present invention includes a method and apparatus for modifying a first version of a computer model in a live environment to create successive additional versions. The present invention also includes a method and apparatus for storing the additional versions and a method and apparatus for ordering additional versions into a temporal sequence to produce a communication. The present invention also includes a method and apparatus for replaying the temporal sequence, such that the temporal sequence is replayed in the live environment.

BRIEF DESCRIPTION OF THE DRAWINGS

The present invention will be understood more fully from the detailed description given below and from the accompanying drawings of the preferred embodiments of the invention, which, however, should not be taken to limit the invention to the specific embodiments, but are for explanation and understanding only.

DETAILED DESCRIPTION OF THE PRESENT INVENTION

A portion of the disclosure of this patent document contains material which is subject to copyright protection. The copyright owner has no objection to the reproduction by any one of the patent disclosure as it appears in the Patent and Trademark Office patent files or records for the purposes of reviewing the patent disclosure, but otherwise reserves all copyright rights whatsoever.

An apparatus and method for model based communication is described. In the following detailed description of the present invention numerous specific details are set forth in order to provide a thorough understanding of the present invention. However, it will be obvious to one skilled in the art that the present invention may be practiced without these specific details. In other instances well known methods, functions, components and procedures have not been described in detail as not to unnecessarily obscure the present invention.

Overview of the Computer System of the Present Invention

Figure 1:
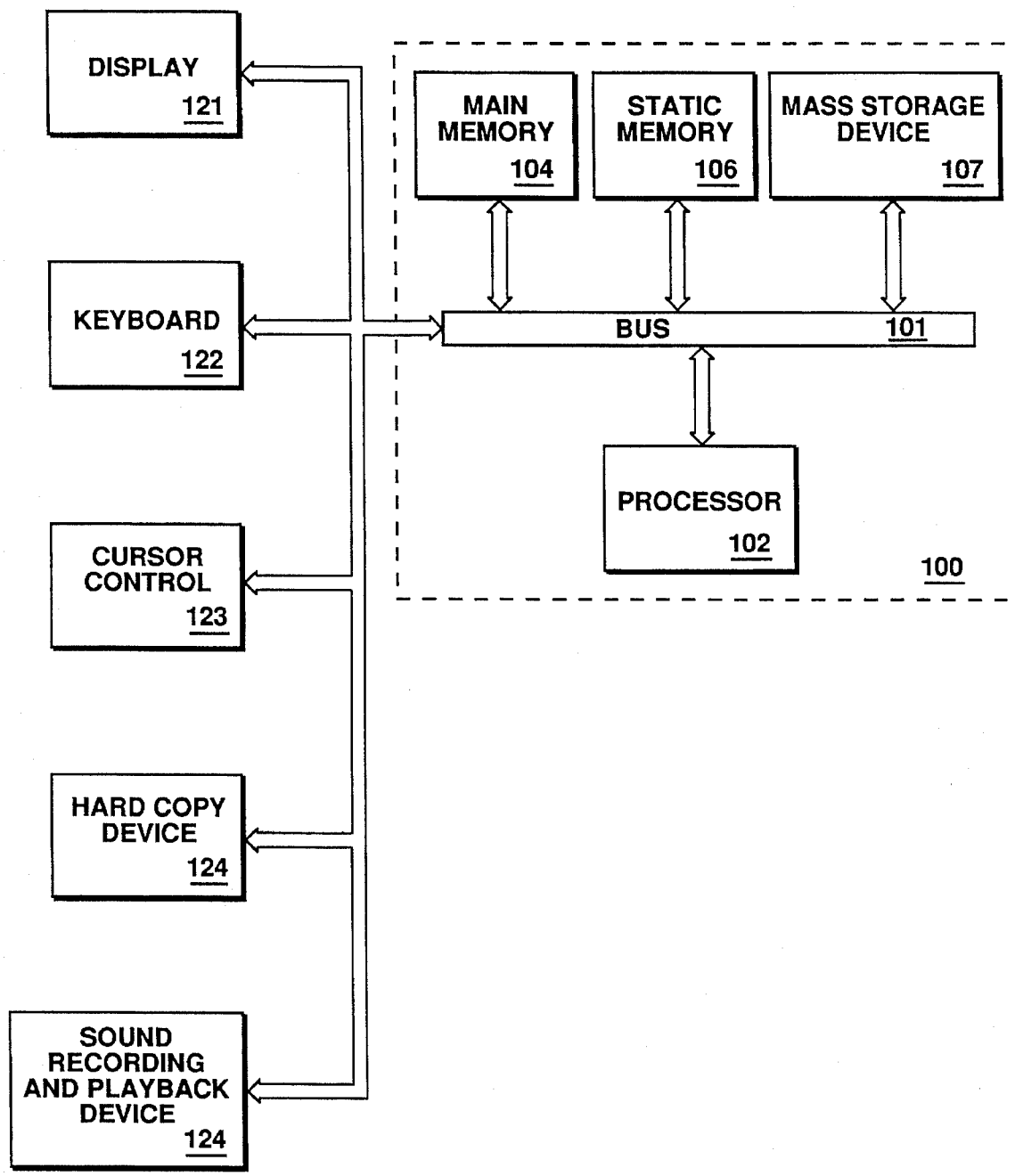
FIG. 1 is one embodiment of the computer system of the present invention.

The preferred embodiment of the present invention may be practiced on computer systems having alternative configurations. FIG. 1 illustrates some of the basic components of such a computer system, but is not meant to be limiting nor to exclude other components or combinations of components. The computer system illustrated in FIG. 1 comprises a bus or other communication means 101 for communicating information, a processing means 102 (commonly referred to as a host processor) coupled with bus 101 for processing information, a random access memory (RAM) or other storage device 103 (commonly referred to as main memory) coupled with bus 101 for storing information and instructions for the processor 102, a read only memory (ROM) or other static storage device 104 coupled with the bus 101 for storing static information and instructions for the processor 102.

Other devices coupled to bus 101 include a data storage device 105, such as a magnetic disk or optical disk including its corresponding disk drive for storing information and instructions, a display device 108, such as a cathode ray tube (CRT), for displaying information to a computer user, and an alpha numeric input device 106, including alpha numeric and other keys, for communicating information and command selections to processor 102. An additional user input device is a cursor control device 107, such as a mouse, track-ball, cursor direction keys, etc., for controlling cursor movement on display 108 and communicating direction information and command selections to the processor 102. This input device typically has two degrees of freedom in two axes, a first axis (e.g., x) and a second axis (e.g., y), which allows the device to specify any position in a plane.

Another device which may be coupled to a bus 101 is hard copy device 124 which may be used for printing instructions, data, or other information on medium such as paper, film, or similar types of media. Lastly, computer system 100 may be coupled to a device for recording sound and/or playback 125, such as an audio digitizer coupled to a microphone for recording information. Further, the device may include a speaker which is coupled to a digital-to-analog (D/A) converter for playing back the digitized sounds.

An embodiment of the present invention is implemented for use on some of the members of the family of Macintosh® family of personal computers, such as the Macintosh® II manufactured by Apple® Computer, Inc. of Cupertino, Calif. (Apple and Macintosh are registered trademarks of Apple Computer, Inc.). Processor 102 is one of the 68000 families of microprocessors, such as the 68000, 68020, or 68030 manufactured by Motorola, Inc. of Schaumburg, Ill.

User Interface

Figure 2:
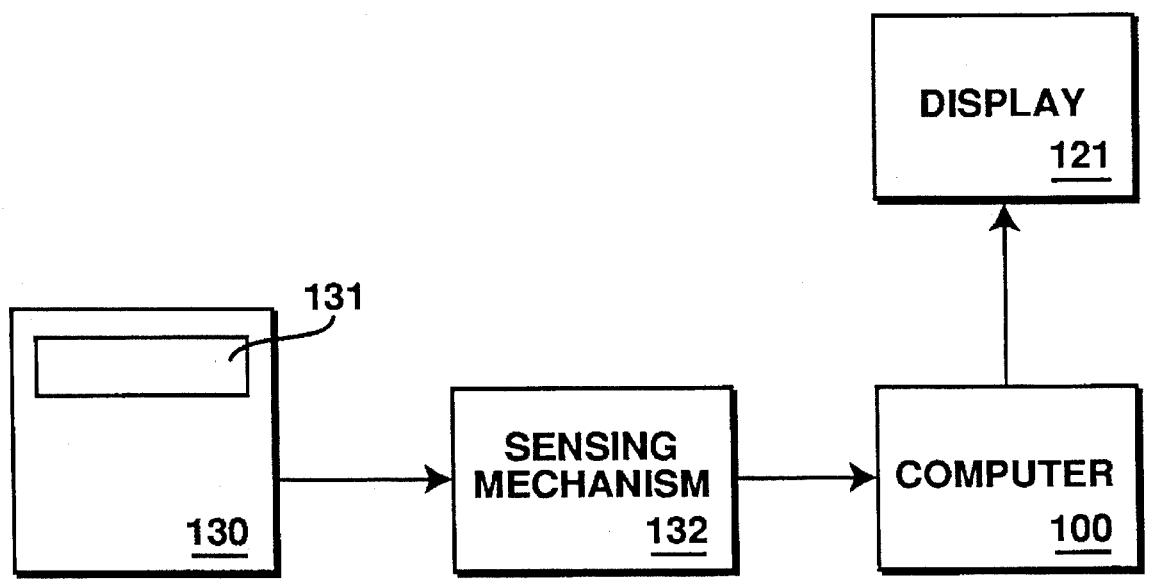
FIG. 2 is one embodiment of a computer system that includes a mouse.

A user interface is the means by which a user interacts with a computer system. Known user interfaces utilize windows and icons in conjunction with a cursor control device. The cursor control device, commonly a mouse or trackball device or a stylus, is used to position the cursor on a display. In one embodiment of the present invention, a mouse is used. FIG. 2 is a block diagram illustrating this embodiment. A mouse 130 is a small hand-held box-like device which is coupled to the computer system 100 by a cable. A sensing mechanism 132 monitors the magnitude and direction of movement of mouse 130 and generates an output signal based thereon. This signal is sent to computer 100 for processing. After processing, computer 100 sends a signal to display device 121, which can effect a changing in the display corresponding to the mouse's movements. One or more push-down button(s) 131 are provided on the mouse

130. By depressing button(s) 131, a signal is sent to computer 100 that a desired location on display device 121 has been selected.

In any event, the combination of windows, icons, and a cursor control device allows a user to operate in a visual "point and click" (or point, in the case of a stylus) fashion rather than through the typing of terse computer commands. A "point and click" operation refers to positioning a cursor on a display so that it appears over a desired icon (the "point"), setting the button on the cursor control device into a second position (usually by depressing the button) and immediately resetting the button in a first position (usually by releasing the button). The "click" generally refers to tactile and audible feedback to the user on depressing and releasing the button.

An operation to invoke an application or gain access to a file directory is the "double click". The "double click" is similar to the "point and click" except that the button on the cursor control device is "clicked" twice in rapid succession.

Windowing systems provide the capability of displaying data in user-definable regions, which are usually rectangular portions of a display screen. Controls are typically provided to re-size and move windows within the confines of the physical display boundaries. Additional controls provide for scrolling data and/or a document through a data display area associated with the window. It is a feature of window systems to provide for multiple viewable windows within the confines of the physical display boundaries. The window system of the preferred embodiment further provides a feature whereby selected items from a first window may be moved to a second window.

Another aspect of the user interface provides for pull-down menus. Such a pull-down menu is described in U.S. Pat. No. Re. 32,632, entitled "Display System", Atkinson, assigned to the assignee of the present invention. In such a pull-down menu system, the cursor is positioned in a predetermined menu area, where the predetermined area denotes a plurality of submenus. While the cursor is positioned in the predetermined area over the name of the desired submenu, a button associated with the cursor control device may be placed in a second (down) position causing the desired submenu to be displayed. The user may then position the cursor to the desired command within the submenu, wherein the command is invoked when the user places the switch associated with the cursor control device into the first (up) position.

One embodiment of the present invention makes extensive use of a cursor control device, icons, windows and pull-down menus to enable an environment that is intuitively familiar to user of a Macintosh® computer system.

Overview of the Present Invention

The present invention allows a person to use a computer model as a communication mechanism. A computer model is transformed into a communication by allowing for the creation, playback, and exploration of a sequence of "unfolding" versions of the model, with an accompanying annotation. By sequencing the versions, the concepts depicted collectively by the versions may be explained as an unfolding story. Humans are very adept to understanding communications presented as stories. Thus, by employing this unfolding, annotated sequence of versions of a computer model, the present invention provides effective communications. Note that a computer model for purposes of the present invention could comprise a spreadsheet, word processing document, simulation, data set, 3-D model, or any representation of information which allows a user to interact with (e.g., modify) the information through the representation. For instance, a spreadsheet model is a set of data formatted into a spreadsheet which may be interacted with. That is, specific alphanumeric entries can be made into boxes in the spreadsheet. Numeric formulas could be implemented into boxes, where the formulas are capable of performing arithmetic operations using values from other designated boxes. Thus, the computer model is not the data in the spreadsheet itself, nor the spreadsheet application program; instead, the computer model is the spreadsheet representation of the data. Note that it is inherent that each of the models are associated with the application program on which they are run on the computer system. The application programs of the present invention include those which provide visual data analysis or modeling.

In order to use a computer model as a communication device, the present invention uses a set of technologies, interfaces and methods which are able to trap the user's interactions with a computer model while they are occurring (i.e., passively). In other words, while a user is interacting with a computer model (e.g., making modification to the model), each change or modification made by the user is recorded. For example, if the user is using a graphing program in which he changes the data set used for a particular graph, then the user's interactions with that particular graph are recorded. These interactions are saved as successive, additional versions.

In one embodiment, at any time during the interaction with the computer model, the user is able to access any or all of the additional versions. In one embodiment, the versions may be accessed according to the order in which they were created. In this manner, the user may access one or more of the versions which were created earlier without having to recreate the version from the initial state. Thus, when building a communication, the user is never required to recreate any of the previously made versions, nor the steps necessary to arrive at a particular version. The user may proceed directly to the particular version in the sequence of versions and retrieve the version of his work at that time.

It should be noted that the additional versions are stored such that they are independent with respect to each other. That is, the versions are not context dependent with respect to each other. Note that since each version may be accessed and is context independent, the versions may be placed in any order (e.g., completely reordered).

The present invention provides for authoring a communication by ordering multiple versions into a temporal sequence. The temporal sequence is an ordering of versions to span a particular time domain. When the temporal sequence is played back, the versions are displayed, therein providing the "unfolding" communication. Thus, the present invention allows for the recording of multiple versions into a communication which may be played back.

Note that the interactions are recorded in such a way that a communication may be provided to another person as a communication that may be viewed in a live environment. In the live environment, the communication may be replayed, explored, and even further extended (through change and modification) in the application environment that created the versions of the computer model (or in an application environment which allows such actions to be performed). As will be discussed below later, the present invention uses vectors to save each version created using the computer model, such that they be used in a communication which may be viewed and used in a live environment. That is, the user upon receiving the communication is able to randomly jump around in the sequence, chain several sequences together, and insert his own actions using the model due to the fact that the vector is context independent with respect to other vectors. Thus, the present invention allows a temporal sequence to be fused with a live environment.

The Nature of the Vectors of the Present Invention

In order to allow a user to record, play back and explore temporal sequences in a live environment, the present invention provides vectors to record the additional versions of a computer model as they are being created. A vector represents the difference between a predetermined neutral state (e.g., 0) and a subsequent state. In the present invention, each difference vector identifies the difference between the neutral state and all successive states of a computer model. In other words, a vector describes how to move from a given state in a document to some agreed upon neutral state, and from the neutral state to the given state. Note that in one embodiment the neutral state comprises the empty state, such as in the case of a graphing environment where the neutral state includes the data set but not any plot. Thus, the present invention uses vectors to trap and record a string of differences made to a computer model while the computer model is being operated on.

Figure 3:
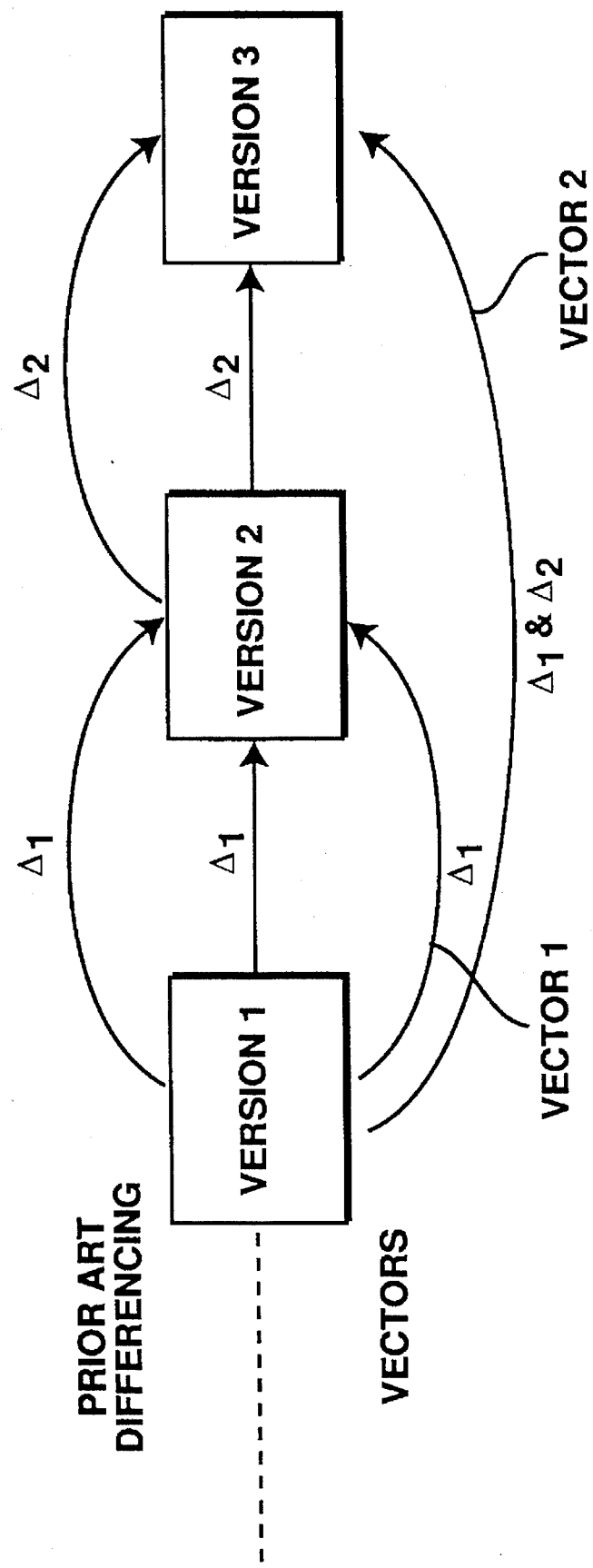
FIG. 3 illustrates the differencing utilized by the present invention.

Note that the difference vectors of the present invention are different from the prior art technique of differencing. In the prior art, differencing represents the difference between a state N−1 and its next state N, and not the difference between state 0 and state N (where state 0 is a predetermined neutral state preceding state N). A distinction between the prior art technique of differencing and the vectors of the present invention may be shown more clearly with reference to FIG. 3. Referring to FIG. 3, three separate versions of a document are shown as Version 1, Version 2 and Version 3. Version 1 represents the neutral state, while Versions 2 and 3 are later versions. The difference between Version 1 and Version 2 is shown are $\Delta_1$, and the difference between Version 2 and Version 3 is shown as $\Delta_2$. In prior art differencing, the difference between Version 1 and Version 2 would be categorized by $\Delta_1$, and the difference between Version 2 and Version 3 would be categorized by $\Delta_2$. Since each difference is based on the previous version, the differencing of the prior art is context dependent. In the present invention, the difference is taken with respect to a neutral state, which is Version 1 in FIG. 3. Therefore, vector 1 represents the difference between Version 1 and Version 2, shown as $\Delta_1$. However, vector 2 represents the difference between Version 1 and Version 3, shown as $\Delta_1$ plus $\Delta_2$. In all subsequent versions, such as Version 4, Version 5, etc. (not shown), the vectors would be defined as the difference between the current state (e.g., Version 5) and the neutral state (i.e., Version 1).

Since the vectors of the present invention are independent of one another, the computer model application program can easily navigate between any two arbitrary vectors (as long as they are both based on the same neutral state). For instance, to navigate from vectors A to vector B, the present invention uses the information in vector A to move the computer model back to the neutral state (i.e., the initial version), and the information in vector B to change the computer model into the desired version. Because the vectors are independent of one another, each may be extracted and/or completely reordered, while still providing the same results when played back. In other words, a vector in a sequence can be moved, deleted, or inserted with correct playback assured.

Note that in one embodiment, each vector comprises a data structure having multiple parts. One part identifies the application program associated with the vector, such that when a sequence of vectors created using multiple applications are arranged into a temporal sequence, the applications necessary to replay the sequence may be called and run. Another part of the vector identifies the neutral version of the computer model associated with the vector. Note that the identification of the neutral version may comprises the filename of the neutral version. A third part of the vector categorizes the parameters or scripts necessary to transform the computer model between the neutral version and desired version corresponding to the vector.

Note that in one embodiment, the vectors includes a set of parameters that would enable the computer model to be changed to the specific version represented by a vector (if the neutral state is known). In the present invention, this type of vector is referred to as a parametric vector. Note that a parametric vector is well-suited for certain kinds of computer models that allow certain interactions to the representation that is produced, such as those computer models having a concept of a view, such as a data visualization view or a 3-D modeling tool. In these types of models, the view may easily be defined by a set of parameters. For example, in a graphing application program, the parameters which may define the view may include the scale parameters for the graph, the designations for both axis, a characteristic of the data set used, etc. In this case, the vector comprises the parameters based on the graph. Furthermore, in one embodiment, a vector may operate to record small parametric changes to a document, such as what-if scenarios on a spreadsheet or initial conditions in a simulation. Also, the parameters may include those parameters necessary to display specific annotations on the display, such as highlights (e.g., shading) or explanatory text on a graph.

In another embodiment, where large numbers of changes to the contents of a document occur, such as a series of modifications to a word processing document, each vector includes a script vector, rather than a set of parameters. The script vector indicates the manner in which the neutral version is to be modified to arrive at the desired version that corresponds to the vector. In one embodiment, vectors are created using a scripting software, such as AppleScript, a product of Apple Computer, Inc. of Cupertino, Calif. In this manner, a larger set of contexts may be utilized by the present invention (e.g., word processing).

Note that in one embodiment, a script vector comprises a pair of scripts. One script would indicate how to modify version to create a given version from the neutral version, while the other script would indicate how to modify a given version to return to the neutral, or initial, version. This second script is required when moving between two vectors. In order for the vectors of the present invention to be independent of one another (i.e., context independent), all of the vectors are created in relation to the neutral state. Thus, in order to move between two vectors that are ordered in a temporal sequence, the computer system returns to the initial version of the computer model from the version associated with one of the vectors (by returning to the neutral state) and then proceeds to the version of the computer model associated with the other vector. Note that this type of requirement is not necessarily required in computer models which may be defined in terms of parameters, as discussed above, because the views produced by the applications associated with these models may be changed with the changing of each individual parameter. It should also be noted that the software producing these scripts, such as AppleScript, a product of Apple Computer, Inc. of Cupertino, Calif., must be able to generate the reverse scripts or have a mechanism (e.g., an engine) to indicate how to reverse (using a script). In one embodiment, the reversal scripts are provided by the application in that for each command there is an "undo" command associated with it which can be invoked to effectuate the reversal.

An algorithm allows the present invention to move smoothly between the two different script vectors without having always to return to the neutral state. For example, a software algorithm may be used which would identify the common portions of two vectors. Once the common portions have been identified, the software algorithm would identify the portion of one of the two vectors to change to arrive at the desired version corresponding to the other vector. That is, if a second vector corresponded to a later version than a first vector, the software algorithm would be able to determine that the second vector included a portion which is duplicated with that of the first vector since the second vector is based on a later point in time (with respect to the interactions with the computer model) and, thus, includes that portion. Note that this is shown in FIG. 3 where vector 1 includes $\Delta_1$ and vector 2 includes both $\Delta_1$ and $\Delta_2$. Once the common portion is identified, the software algorithm would modify one or the other of the two vectors to arrive at the desired version. This modification step must first determine if the move between the two vectors involves a move from a later version to an earlier version or vice versa. If the move is to an earlier version, the software algorithm would initiate the undoing or reversal scripts that are not common to both. If the move is to a later version, the software algorithm would initiate only the scripts that are not common to both which caused the modifications to be made to arrive to the later version.

Authoring a Communication of Temporal Sequences

Because a vector is not context dependent, the present invention allows a sequence of vectors to be placed in any order to create a "communication". Note that in one embodiment, the application programs used when performing the authoring process (and when performing the related playback process) described below are customized to provide an environment conducive to use the present invention.

Figure 4:
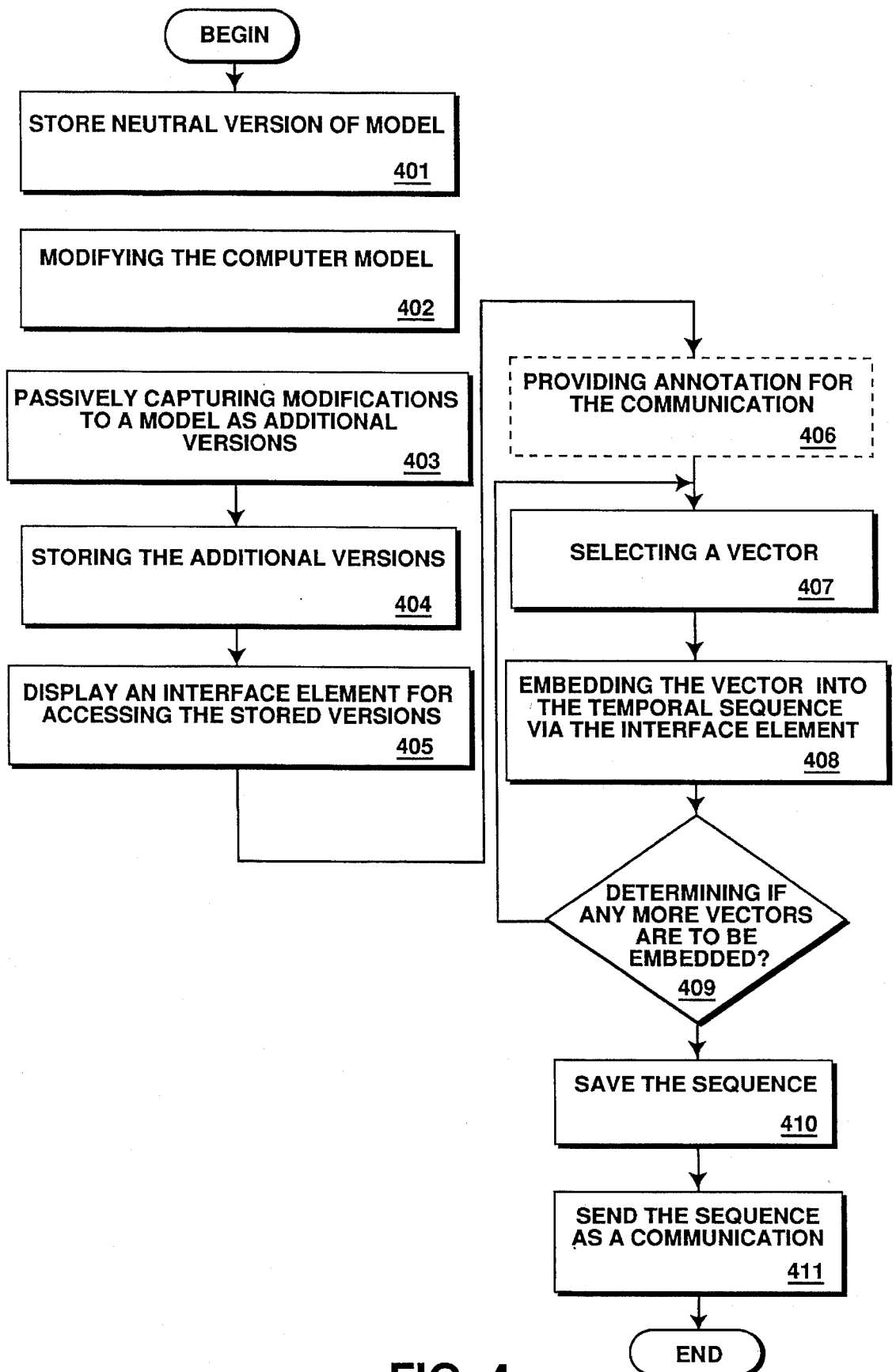
FIG. 4 is a flow chart of the authoring process of the present invention.

One embodiment of the process of authoring a communication is depicted in FIG. 4. Referring to FIG. 4, the communication process begins by storing the neutral (i.e., initial) version of a computer model (processing block 401). It should be noted that storing the neutral version may include identifying the filename of the computer model. Next, modifications are made to the computer model to create additional versions of the computer model (processing block 402). Thus, additional versions of the model are created while the model is being used (e.g., explored).

As a model is being used, the changes made by the author (i.e., the additional versions) are passively captured as additional versions (processing block 403). In one embodiment, the additional versions are captured as vectors using a "get vector" function. In another embodiment, the additional versions are initially stored as scripts that are later converted into vectors when the additional versions is chosen for inclusion into the communication. Each of these vectors is then stored (processing block 404). In the present invention, the vectors are stored into one or more buffers. In one embodiment, one buffer stores the manner in which the change is made to the initial version of the document to obtain the current version, and another buffer stores the manner in which the reverse of the change is implemented (i.e., a change to the current version to return to the initial version). For instance, to implement the use of script vectors, two separate buffers would be maintained while a user manipulates a computer model (e.g., a document). Every time the user made a change, the script that is capable of generating that change would be added to the end of one of the two buffers, while the script that is capable of reversing, or undoing, that change would be added to the top of the other buffer.

Note that in one embodiment, only the scripts and/or parameters necessary to effectuate the change to the computer model and its reverse are stored. In this embodiment, a vector is created only upon selection of a particular version for insertion into a temporal sequence.

One example of the "get vector" code implemented in Lisp programming language for use with TableTop, a product of Technology & Education Research Center of Cambridge, Mass., and capable or providing the "get vector" function of setting the information for a vector is shown in Appendix A.

After the additional versions are stored, an interface element is displayed which permits the author to access the stored versions (processing block 405). This interface element displays the versions according to the time domain, such that the versions may be accessed according to the time of their creation. It is through this interface element that the author is able to access previous versions so that they may be included in a recorded sequence. Note that when the author accesses these previous versions, the vectors associated with these versions are actually being accessed.

In one embodiment, this interface element represents a time line which may be scrolled to arrive at the desired version, when its time of creation is unknown or uncertain. Note that this interface element may be displayed while the changes are being made with the model, such that at any time when working with a model, the author has access to all of the previously generated versions. In one embodiment of the present invention, a history scroller passively captures into a "version" every change the author makes to the document while he is working on it. Thus, the history scroller is used as the interface element to depict temporally the work performed using the model.

Once the modifications have been completed, the author may provide an annotation (processing block 406) which is to accompany the sequence of versions. In one embodiment, the annotation is performed using another application program. In the present invention, the application program may be capable of recording a text message, an audio message, and/or a video message (having both video and audio). Note that in one embodiment, the annotation may be produced (recorded) before or during the creation of the "versions" with the model. In order to create the annotation during the time the model is being run, the present invention employs a windowing scheme. In this manner, the author may move between the various application programs. Note that in one embodiment, the author must record the annotation first and then synchronize the versions to it. In another embodiment, the annotation occurs after the other versions have been place in synchronization (i.e., into a temporal sequence).

The author is then ready to record a sequence of versions. The sequence is recorded by selecting a version for inclusion in the communication (processing block 407). In one embodiment, a version is selected through the use of the first interface element. By scrolling through the various versions which were passively captured, the author is able to select any of the desired versions that were created when working with the model. In this manner, the author is able to browse the time domain for the desired version(s). In actuality, the author is selecting the vectors associated with the desired version. Note that when the user wishes to extract a version to embed into a sequence, the location of the scripts corresponding to the versions in both buffers are located and the contents of each buffer up to that location will serve as the two scripts comprising the script vector.

Once a vector has been selected, the vector is inserted into a temporal sequence (processing block 408). In the present invention, the vectors are inserted into a temporal track, such as that used by QuickTime, a product of Apple Computer, Inc. of Cupertino, Calif., a software architecture for playing movies (i.e., video clips). In the present invention, the temporal track makes use of a time-based call mechanism to have the temporal sequence of versions played back at a later time. Note that in the present invention, the time-based call mechanism has the ability to call any arbitrary function at any arbitrary time. By using this mechanism, the present invention is able to "daisy-chain" a series of calls, each corresponding to a vector, to produce a communication comprised of a series of versions of a computer model. When each vector is selected, it is placed in a timeline with respect to the other vectors, such that the vectors are ordered. When each vector is inserted into the temporal track, the time to call the vector is stored in a time list and its associated vector is stored in a separate call list, such that during playback the vector will be called and invoked at the particular time stored in the time listing under the initiation of the time-based call mechanism. In this manner, the vector is associated with a particular point in time. Note that in one embodiment, scripts are used to actually perform the call of the vector at the appropriate time in the time listing. An example of code written in HyperCard, a product of Apple Computer, Inc. of Cupertino, Calif., for creating the functionality of a temporal scripting track for QuickTime, a product of Apple Computer, Inc. of Cupertino, Calif., is shown in Appendix B.

Note that if a vector from one application program is being embedded into a temporal sequence in conjunction with another application program, the application program responsible for embedding the vector generates a "get vector" call and a computer event is used to facilitate the interapplication communication. Note that the operating system of the computer system recognizes the event, such that the transfer of the vector to the control of the other application program would be permitted. An example of one embodiment of the "get vector" code implemented in Lisp programming language for TableTop, a product of a product of Technology & Education Research Center of Cambridge, Mass., and capable of providing the "get vector" function of setting up the information in a vector is shown in Appendix A.

Then the author determines if any other versions are to be included in the temporal sequence (processing block 409). If other versions are to be included in the temporal sequence, then processing continues at processing block 407. If no other versions are to be included in the sequence, then processing continues at processing block 410, wherein the sequence is saved.

After the sequence is saved, the communication is complete and may be sent to another person (processing block 411). The communication created by the authoring process may be sent by various methods and mechanisms well-known in the prior art. For instance, the communication may be transferred between nodes on a communication network or may be transferred physically on a diskette. Note that the communication may not be physically transferred anywhere, such that its use may be confined to the same environment in which it was produced.

Note that a user could author this kind of sequence using a macro tool. However, the method for authoring, editing and playback of such a sequence would be considerably more difficult and less powerful. For example, a macro tool allows one to create a macro into two different fashions. First, a macro can be create through a live recording. Second, macros can be created through a macro language. Usually, these two require a fair amount of explicit effort to record a macro sequence. The present invention, however, would enable the passive capturing of the discovery while the user first made it. The sequence of versions that represented this discovery would appear in the history scroller where the user could access them directly, rather than recreating them. No such passive captures is possible with macros, however, because of the context dependency of macros make them hard to edit. If one has a macro that does three things, there may be no easy way to pull out just the middle action and still have it function as a macro. Therefore, the user would not be able to scroll through the document history and extract just the versions he desires.

Because of the lack of the context sensitivity of vectors, the present invention offers an editing process as part of the method of construction. For the first time, it is possible to have an interface that supports the re-ordering, deletion and insertion of versions in a sequence. Such editing makes the construction of these sequences much easier and much more powerful than the macros.

The Capture Mechanism of the Present Invention

Figure 5A:
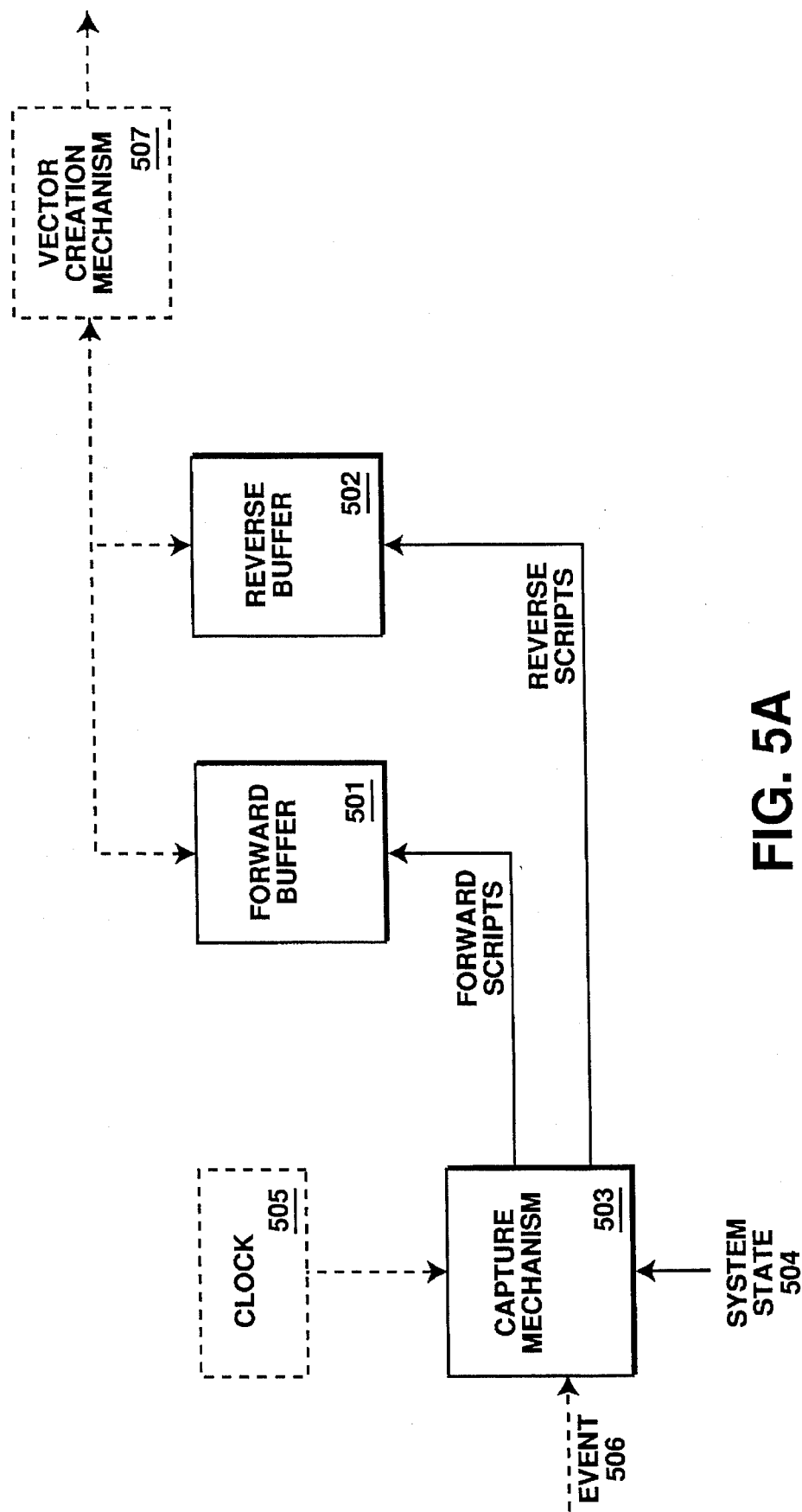
FIGS. 5A and 5B are block diagrams of embodiments of the capture mechanism of the present invention.
Figure 5B:
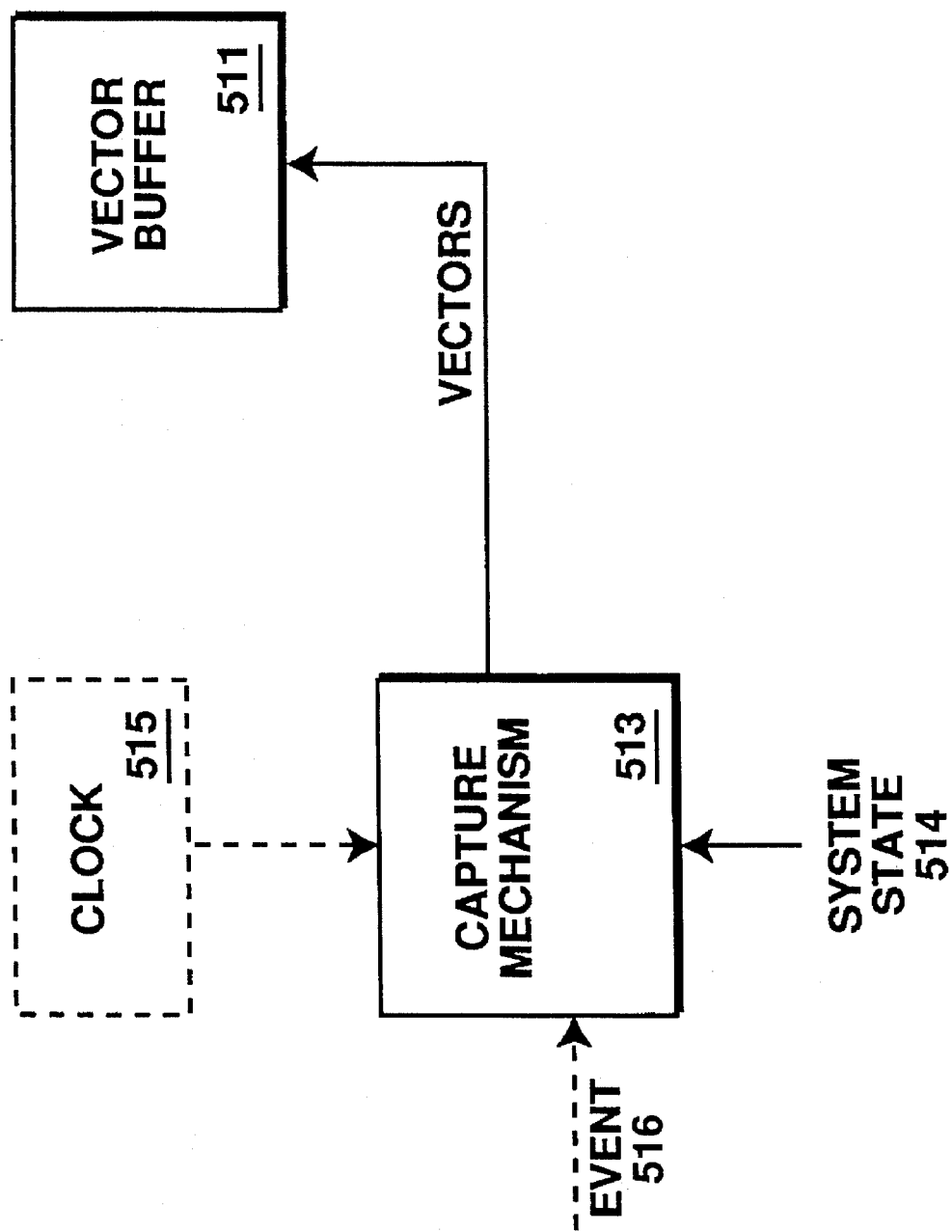

Two embodiments of the mechanism responsible for passively capturing the additional versions and storing them in buffers are shown in FIGS. 5A and 5B. Referring to FIG. 5A, a capture mechanism 503 is shown coupled to receive the system state 504. Capture mechanism 503 is coupled to forward buffer 501 and reverse buffer 502. Forward buffer 501 stores the scripts responsible for changing the initial version to the current (additional) version. Reverse buffer 502 stores the scripts responsible for returning the current (additional) version to the initial version. The scripts stored by forward buffer 501 and reverse buffer 502 are produced by capture mechanism 503 in response to the system state 504. Capture mechanism 503 operates when the application environment, within which the computer model is modified, is being run and may be signaled to operate in response to an event from the operating system.

In one embodiment, every change or modification made by the user to the computer model is encoded as scripts that are stored in forward buffer 501 and reverse buffer 502. In another embodiment, a software algorithm in cooperation with a time-based system could evaluate the current state of the model with respect to the initial state and then record as scripts only that which is necessary to change the initial version to this additional version (or vice versa). The time-based system produces the scripts according to system state 504 at predetermined time intervals. The predetermined time intervals are indicated by a clock, such as clock 505, or an event from the operating system, such as event 506. Note that in this embodiment, any intermediate changes which are not represented in the current version may be filtered from the vectors (i.e., ignored), while those which are directly representative of the current version become scripts.

Note that FIG. 5A includes a vector creation mechanism 507 which creates the vectors using the forward and reverse scripts in buffers 501 and 502 respectively. Vector creation mechanism 507, which may be a part of capture mechanism 503, uses a "get vector" function to create the vectors. Vectors may be created immediately upon the storage of another set of scripts in buffers 501 and 502. In one embodiment, the vectors are only created by vector creation mechanism when a particular version is chosen for embedding into a temporal sequence.

Referring to FIG. 5B, a block diagram of the capture mechanism for creating and storing parameter-based vectors is shown. The capture mechanism in FIG. 5B is utilized for modeling environments which are able to record differences between the initial version and a later version (i.e., version N) without knowing about or having to take into account intermediate versions between the two. In this embodiment, a software algorithm may be used to evaluate the current state of the model with respect to the initial version and then records it as a difference vector that includes only those parameters which are necessary to change the initial version of the computer model to the current version. Note that capture mechanism 513 uses the "get vector" function to create the vector.

A capture mechanism 513 is shown coupled to receive the system state 514. Capture mechanism 513 is coupled to vector buffer 511. Vector buffer 511 stores the difference vectors responsible for changing the computer model between the initial version and the version corresponding to the vector. The difference vectors are produced by capture mechanism 513 in response to system state 504 and operates in the application environment used to represent the computer model.

In one embodiment, capture mechanism 513 encodes every change or modification made to the computer model by the user into a difference vector comprising a set of parameters. In another embodiment, capture mechanism 513 operates as a time-based system that produces difference vectors according to system state 514 at predetermined time intervals.

Playing Back a Communication of Temporal Sequences

Figure 6:
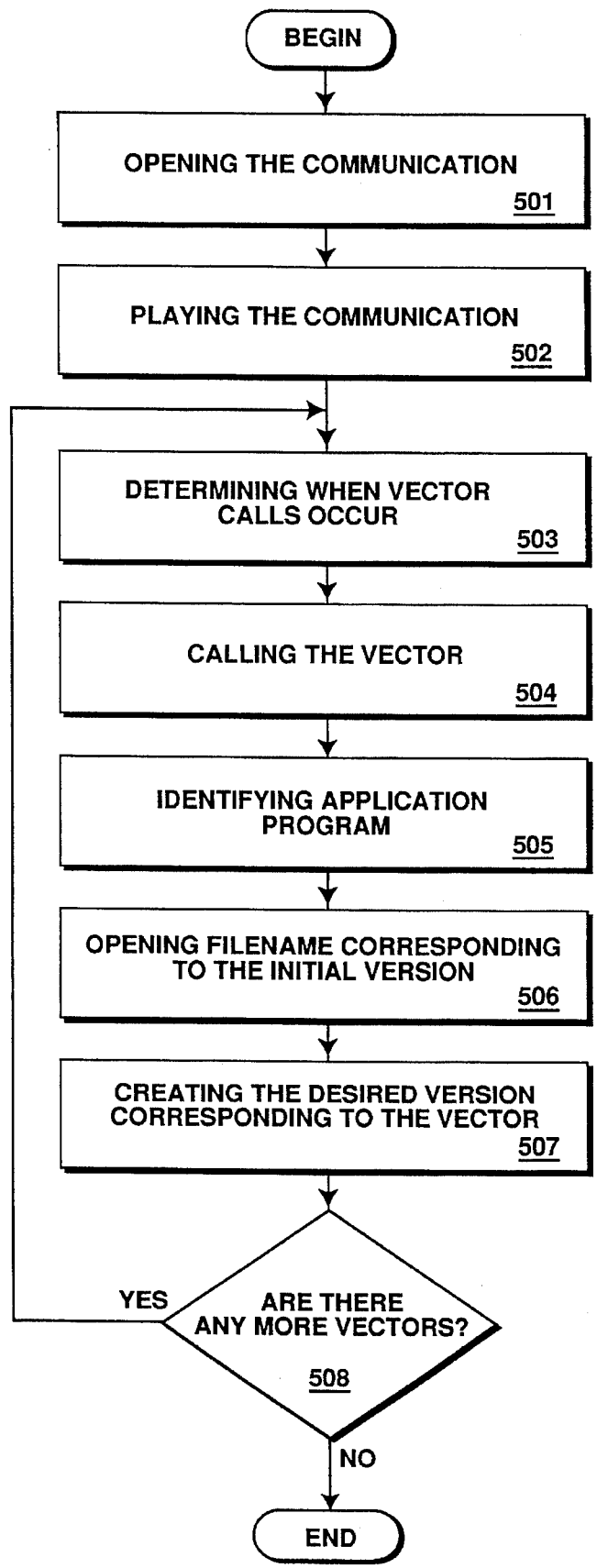
FIG. 6 is a flow chart of the playback process of the present invention.

The playback process of the present invention is shown in FIG. 6. Referring to FIG. 6, the user (i.e., the receiver of the communication) initially opens the file corresponding to the communication (processing block 501). In one embodiment, the opening of the file occurs by performing a "double click" in rapid succession on the file icon or name using a mouse. The "double click" causes the operating system to open the file.

Once the file has been opened, the track is played (processing block 602). In one embodiment, the user triggers the playing of the track (e.g., playing the video). In response to the playing of the temporal track, the time-based call mechanism determines from the time listing when the vectors are to be called (processing block 603). Next, the vector is called (processing block 604). In one embodiment, the vector is called by the program responsible for playing the temporal track. The call by the program is made using a "set vector" function which causes the view corresponding to the vector to be depicted using the parameters or scripts in the vector. This call is posted as an event which the operating system sends to the application program of the invention. An example of one embodiment of the "set vector" code written in the Lisp programming language for the TableTop application program, a product of a product of Technology & Education Research Center of Cambridge, Mass., and capable of providing the "set vector"function is shown in Appendix A.

In another embodiment, when a particular time in the time listing occurs, an event is posted in an event loop for the operating system to handle. In response to the event, the operating system calls the vector.

When the vector is called, its application program is identified and brought up (processing block 605) and the filename corresponding to the initial version is opened (processing block 606). Note that in one embodiment, the temporal track program identifies and brings up the application program. In another embodiment, the application program is started in response to an event to the operating system.

The application program then uses the information in the vector to create the desired version corresponding to the vector (processing block 607). It should be noted that in one embodiment, the application program opens the file corresponding to the initial version and creates the desired version itself. Once the desired version has been displayed and the temporal track continues to run, the present invention determines if there are any more vectors in the temporal track (processing block 607). If so, the processing continues at processing block 603. If not, processing ends.

A user's is able to interact while playing back a communication made according to the present invention. At any point, the user can stop the play back of the sequence and rewind or fast-forward an arbitrary amount time in the sequence of the communication. This causes the document to reset itself to the appropriate version in the sequence. In one embodiment, this is accomplished by uses a time line scroller which allows the entire communication to be scrolled in the time domain. Note that any actions taken by the user do not affect the message. In fact, any interactions with the computer model may be passively captured to produce another message. This interaction includes being able to create a communication using the versions in a played back communication. In other words, by using the present invention, a user may reply to a communication using the versions (i.e., the views) from the communication. This is also permissible because the vectors associated with the versions are context independent.

It should be noted that rewinding would not be possible in a macro sequence because macros are not reversible. Additionally, the user could call up another sequence and run it immediately without resetting the document to some arbitrary state;this would be required by a context-dependent macro. Finally, the user can interact with a live document in the middle of a sequence and the sequence is still correct when continued.

One Embodiment of the User Interface Environment of the Present Invention

Figure 7:
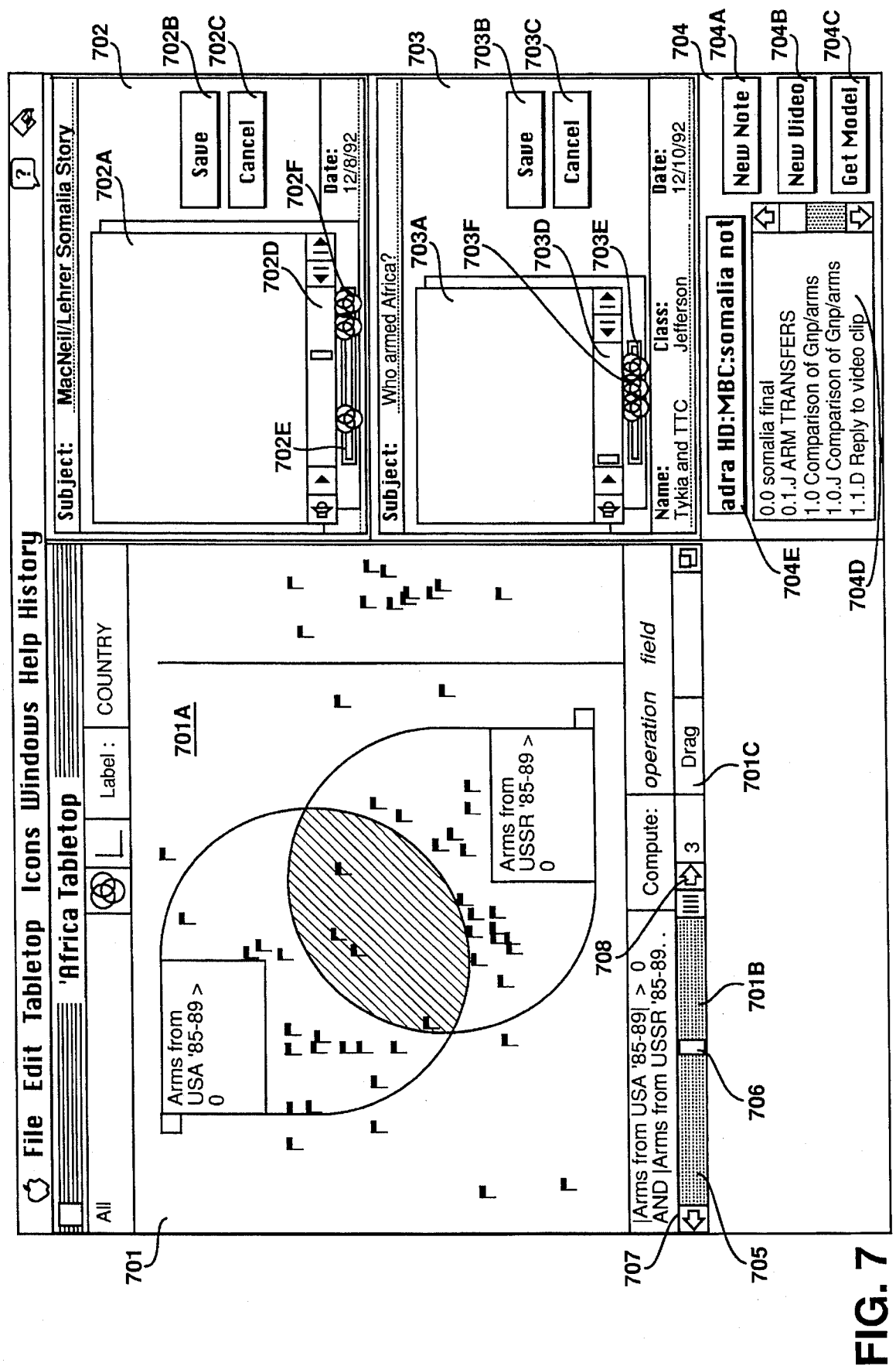
FIG. 7 is one embodiment of an interface environment for use with the present invention.

One embodiment of the user interface environment is shown in FIG. 7. Referring to FIG. 7, three interface areas are shown: area 701–703. An additional area for accessing applications and files is shown as directory area 704.

In application area 701, a graphical application is shown depicting graph 701A. A history scroller 701B and a "drag"

box 701C are also included in application area 701. In application area 702, a video 702A is shown with save box 702B for saving the video sequence, cancel box 702C for canceling the video sequence and scroller 702D for providing time domain access to the video sequence. A sequence bar 702E is shown for positioning versions (and their associated vectors) in a temporal sequence. Individual versions have been placed on sequence bar 702E, such as those shown by icons 702F. In application area 703, a video 703A is shown with save box 703B for saving the video sequence, cancel box 703C for canceling the video sequence, and scroller 703D for providing time domain access to the video sequence. A sequence bar 703E is shown for positioning versions (and their associated vectors) in a temporal sequence. Individual versions have been placed on sequence bar 703E, such as those shown by icons 703F.

Area 704 allows the user to access to different communications, such as videos and notes. A directory 704D is shown as well as the currently highlighted directory item 704E. Directory 704D display a list of notes which the user may call up to view. When requesting a new model, the user activates the get model 704C box with a mouse. A new note box 704A is included and may be activate by the mouse to cause a note to be opened in either areas 702 or 703 to allow the creation of a note to annotate the temporal sequence of versions created in area 701. A new video box 704B is included and may be activate by the mouse to cause a video application to be opened in either areas 702 or 703 to allow the creation of a video to annotate the temporal sequence of versions created in area 701.

As the user interacts with the application in area 701, each version is recorded. An access to each of the version is done through history scroller 701A. By placing control knob 706 in the proper location along horizontal bar 705, the desired version may be currently displayed in the display area 701A. The desired version is accessed when it is to be selected for placement in a temporal sequence.

History scroller 701A is a scroll bar comprised of a horizontal bar 705, a control knob 706, and arrow icons 707 and 708. If the cursor is positioned over control knob 706, control knob 706 will track the horizontal movements of the mouse by sliding right and left horizontal bar 705 as the mouse is dragged right and left, respectively. Control knob 706 will continue to track the horizontal mouse movements until the mouse button is released. All the while that control knob 706 is being moved, the time domain is browsed right and left according to the horizontal position of control knob 706.

Arrow icon 702 resides at the left of horizontal bar 705 and points left. When the cursor is position over arrow icon 707 and then depressed, the time domain of the versions may be scanned to the initial version (in relation to time of creation). Note that control knob 706 will also slide left on horizontal bar 705 as arrow icon 707 is selected by the mouse. Arrow icon 708 resides at the right of horizontal bar 705 and points right. When the cursor is positioned over arrow icon 708 and then depressed, the time domain of the recorded versions may be scanned towards the final version (in relation to time of creation). Note that control knob 706 will also slide right on horizontal bar 705 as arrow icon 708 is selected by the mouse.

Thus, by operating the mouse, control knob 706 may be positioned on horizontal bar 705 such that the desired version may be displayed and selected. It should be noted that history scrollers 702D and 703D operate in the same manner.

Once the user has determined which version(s) are to be included in the temporal sequence, the user utilizes drag box 701C to insert the version into a temporal sequence. Drag box 701C is used wherein a specific version is selected for inclusion in a temporal sequence by dragging the desired version into a sequence bar in one of the other application areas, such as sequence bar 702E in area 702 or sequence bar 703E in area 703. When the author drags on the drag box, he extracts the current version of the document, which is symbolically represented by the cursor changing into a particular icon. The user can then "drop" this iconic version onto the time line interface of a sequence bar. The sequence bar consists of a timeline with various versions (represented by icons) placed along it. By dropping the iconic version onto the sequence bar, the user is essentially inserting the version into the temporal track. Note that one example of code, written in HyperCard, a product of Apple Computer, Inc. of Cupertino, Calif., for performing the drag and drop functions is shown in Appendix C. Thus, in one embodiment, the vector is embedded by selecting the version corresponding to the vector and inserting the version into the time domain of a sequence (i.e., the temporal track). Note this procedure can be used in replying to a communication, wherein the user may insert versions created by himself/ herself or those in another communication, such as a video clip. For instance, if the versions are being inserted into one video track, other versions (i.e., vectors) from another video track may be used.

Note that a control knob (not shown to avoid unnecessarily obscuring the invention) on the sequence bar represents the temporal state of a sequence. When an iconic version is "dropped" onto the sequence bar, it is embedded in the current temporal location of the control knob. When the sequence plays, this control knob moves along the timeline. The user can move the control knob to move to a given point in time in the sequence.

An Example Communication Using The Present Invention

Figure 8A:
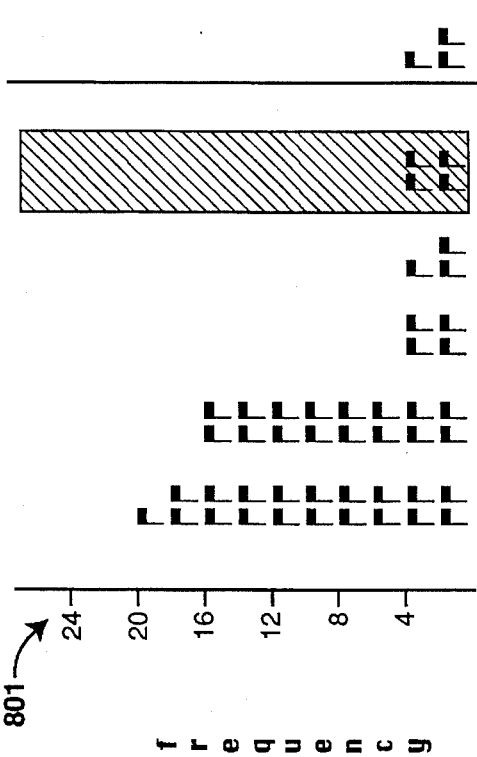
FIGS. 8A–8C are display screen pictures depicting an example of a communication of the present invention.
Figure 8B:
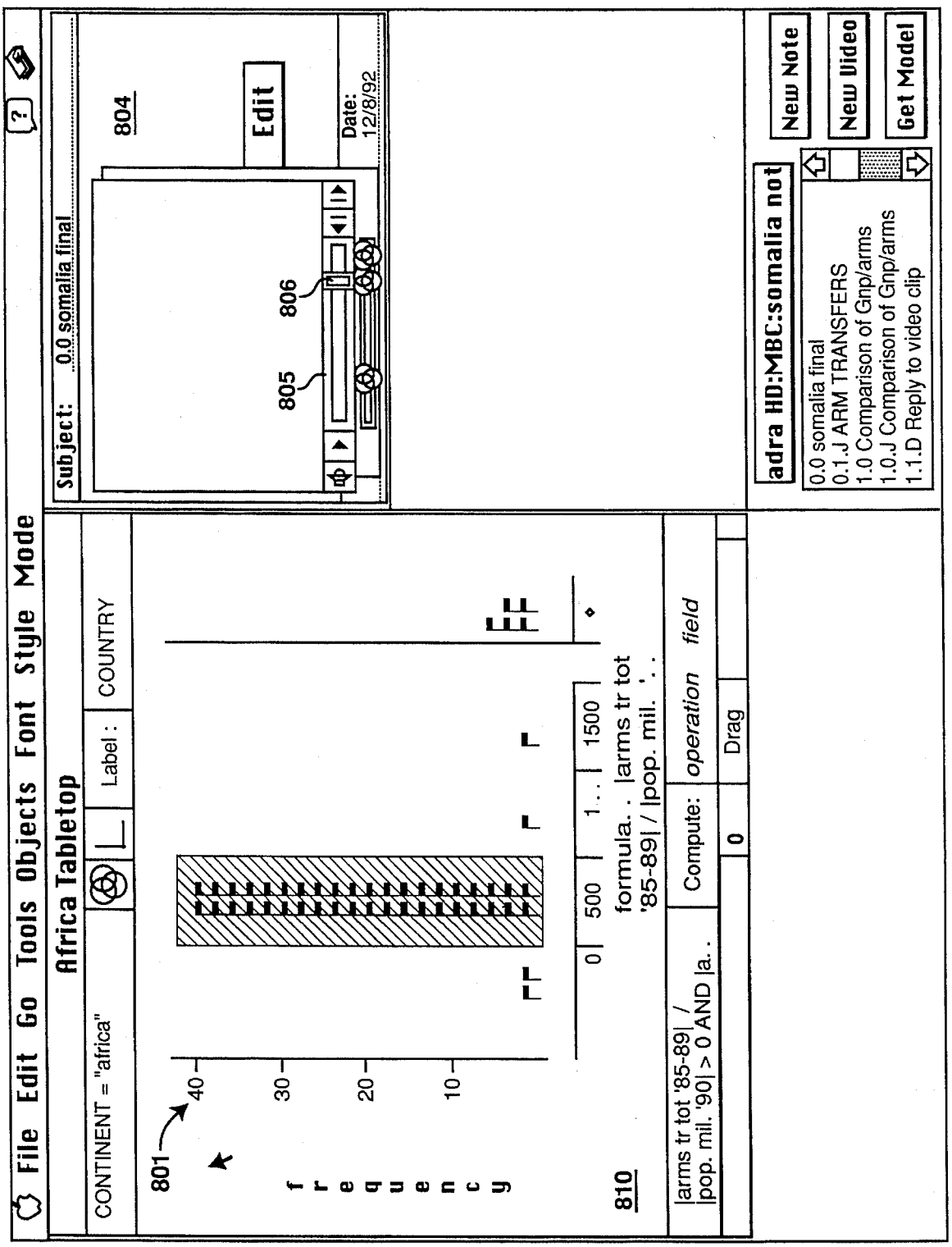
Figure 8C:
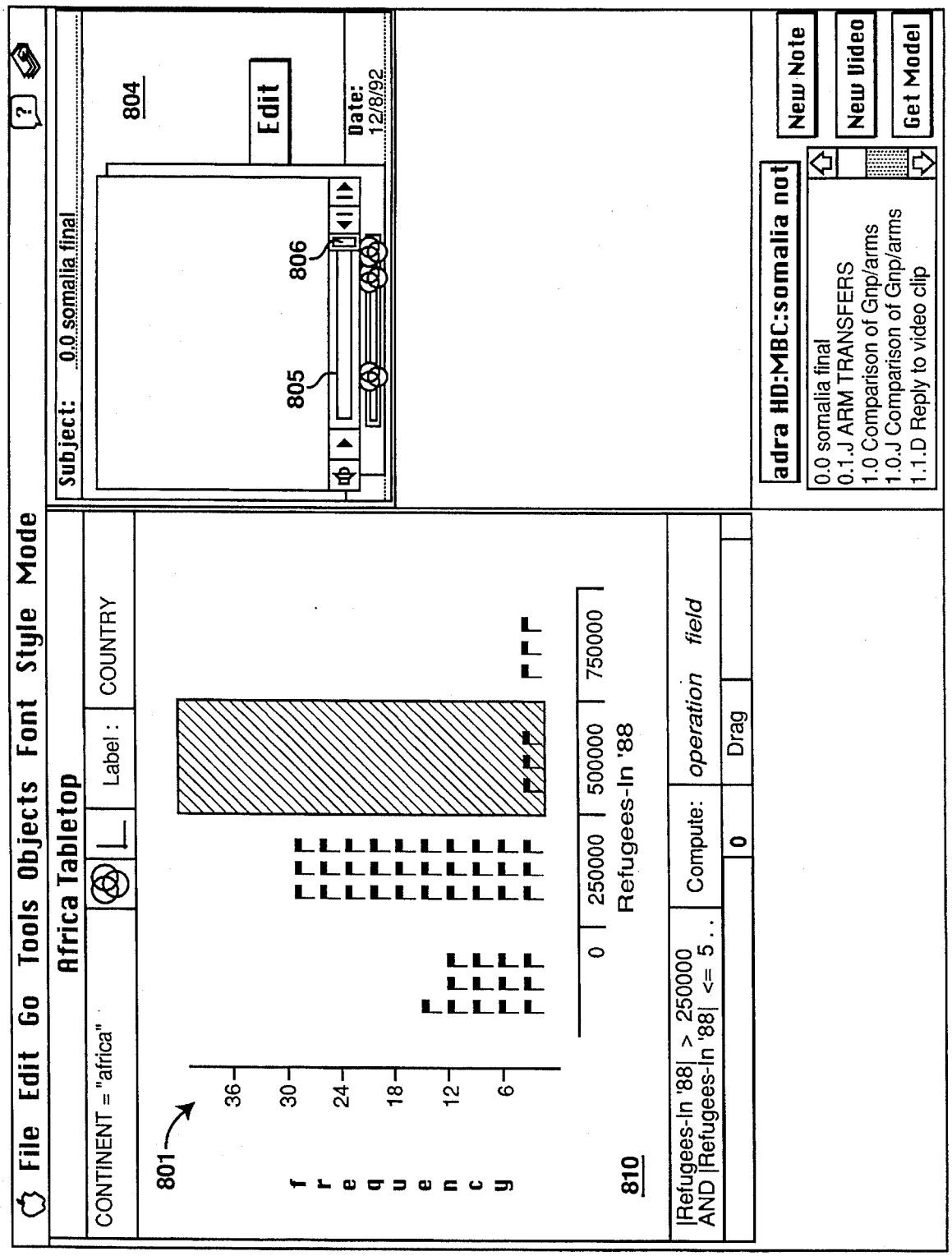

An example using the present invention is depicted in the screen shots of FIGS. 8A–8C. The examples shown in FIGS. 8A–8C include displaying three graphs, each of which are a version of a computer model, shown as 801–803 respectively. The graphs depicted representations made using the application program TableTop, a product of a product of Technology & Education Research Center of Cambridge, Mass. The vectors associated with the graphs 801–803 in application area 810 are shown in Table 1 below where the fields in the vector are shown in Table 2 with reference to Table 1.

TABLE 1

Example Vectors

Vector for 801:
 ("CONTINENT = \"africa\"" axes "Ind-From" :frequency nil nil (((4 . 4): all-segment))) "COUNTRY" nil "tabletop.app" "Africa" "" (nil nil) nil)

Vector for 802:
 ("CONTINENT = \"africa\"" axes (:formula "larms tr tot '85–89l/lpop. mil. '90l") :frequency nil nol (((1 . 1) :all-segment)) "COUNTRY" nil "tabletop.app" "Africa" "" (nil nil) nil)

Vector for 803:
 ("CONTINENT = \"africa\"" axes "Refugees-in '88" :frequency nil nil (((2 . 2) :all-segment)) "COUNTRY" nil "tabletop.app" "Africa" "" (nil nil) nil)

Note that in the above example vectors, the order in which the parameters are listed is always the same (i.e., order dependent). Therefore, the value of any of the parameter types may be identified simply by locating that particular parameter type's position in the list. It should be noted that the the parameters could listed in a vector independent of order. In such a case, each parameter would be associated with an identification to ascertain the parameter type to which the value was associated.

TABLE 2

Annotated Description of a TableTop Vector

| | |
|---|---|
| ("CONTINENT = \"africa\"" | View Constraint |
| axes | View Type |
| "Ind-From" | X-Axis Variable |
| :frequency | Y-Axis Variable |
| nil | Venn Plot Specification |
| nil | Venn Plot Hilite |
| (((4 . 4) :all segment)) | Axis Plot Hilite |
| "COUNTRY" | Lable Variable |
| nil | Display Labels |
| "tabletop.app" | Vector Application |
| "Africa" | Vector Model |
| "" | Vector Name |
| (nil nil) | View Computation |
| nil) | Display View Computation |

The communication created using the present invention comprises the three versions annotated with a video clip. Referring to FIG. 8A, the video clip is shown in area 804. The three versions are ordered in a temporal track and represented on sequence bar 807 as overlapping circle icons 808A–808C respectively. The video clip is synchronized with the temporal track (i.e., they are synchronized with sequence bar 807).

The video clip is started by a play button shown as 820 being depressed using the mouse, therein causing the temporal track to be started. As the video plays, the time domain is represented by a control knob 806 on scroller 805. When control knob 806 slides into alignment with icon 808A, the vector 1 is called, thereby causing the graph 801 to be displayed in application area 810. The graph 801 will be displayed while the video clip continues showing. When control knob 806 slides into alignment with icon 808B, then the version of the computer model "Africa" associated with vector 2 is displayed. To display the version associated with vector 2, the parameters associated with vector 1 are replaced by those in vector 2. An algorithm updates the graph by transitioning between the parameters in vector 1 and vector 2. Thus, using the new parameters, the next graph is displayed. The video clip continues to run, and when control knob 806 slides into alignment with icon 808C, then the version of the computer model "Africa" associated with vector 3 is displayed. This third version is displayed by replacing the parameters associated with vector 2 with those found in vector 3.

Note that in the above example, because of the nature of the vectors (being that they are parameters), the TableTop application program, a product of a product of Technology & Education Research Center of Cambridge, Mass., need only have the parameters and the computer model in order to present the graph associated with a vector. In other applications, where the vectors include scripts, it will undergo a first set of modifications to return the view to the initial version (using the reverse scripts) and then undergo a second set of modifications to bring the view to the next version (using the formal scripts).

Note also that if at anytime the user moved control knob 806 (using the mouse) in either the left or right directions, then the video would be replayed along with the replotting of any of the graphs that would be encountered on the sequence bar as the move occurred.

By using the present invention, the same document that has been used to generate ideas can also be used to communicate information, using only a small amount of additional work. Instead of using an entirely separate medium for communicating a particular discovery or result, the present invention allows the same medium in which the particular discovery or result was produced to be used in providing the communication. Note that this results in a time savings. For example, instead of writing a text e-mail message about one's findings with a spreadsheet, the user can utilize the already completed spreadsheet to communicate. Thus, the time to produce a communication in another application is eliminated. The users previous interactions with the spreadsheet have been saved with all of the user's results, such that these may be used in the communication. Furthermore, the unfolding spreadsheet sequence would be able to add insight into the manner in which the discovery was reached.

Moreover, the present invention allows a user's work to be explored and extended by others. Note that this includes being able to understand another person's work (i.e., the author's work). That is, the present invention allows a person to view an unfolding recreation of the work of another for oneself rather than having to think through static results, such as screen shots. By helping to create documents that "tell stories" about themselves, the present invention is able to allow a person to understand the basis for results more quickly and greatly increase the value derived by a larger group from an individual's work. Since these "stories" are in a live environment, a user may explore the results by actually interacting with the computer model themselves. By allowing users to explore around and continue working with the models, the present invention allows a person more easily to appropriate the work of another.

Whereas many alterations and modifications of the present invention will no doubt become apparent to a person of ordinary skill in the art after having read the foregoing description, it is to be understood that the particular embodiment shown and described by way of illustration is in no way intended to be considered limiting. Therefore, references to details of the preferred embodiment are not intended to limit the scope of the claims which in themselves recite only those features regarded as essential to the invention.

Thus, a method and apparatus for providing communication with a computer model has been described.

APPENDIX A

Code Listings for
Model Based Communication Patent
By: Rick Borovoy and Eric Cooper
Apple Computer
4/19/93

LISP CODE FOR GET-VECTOR AND SET-VECTOR

```
;; This portion of the Lisp code determines which is the front most window in
;; the windowing environment and then calls the next code segment to
;; produce a vector corresponding to the version displayed in that window.

(defmethod get-vector ((foo t))
  (let ((fd (front-window)))
    (when (eq (class-name (class-of fd))
          '*tt-window)
      (get-vector fd))))

;; This portion of the code obtains the current value of each of the parameters
;; listed from the current version of the computer model in a particular
;; window to produce a vector. Note that this example corresponds to a
;; TableTop implementation.

(defmethod get-vector ((tt *tt-window))
  (list
    (get-view-constraint tt)      ; 1
    (get-view-type tt)            ; 2
    (get-x-axis tt)               ; 3
    (get-y-axis tt)               ; 4
    (get-venn-spec-list tt)       ; 5
    (get-selected-venn-list tt)   ; 6
    (get-axes-selection-list tt)  ; 7
    (get-label tt)                ; 8
    (labels-shown-p tt)           ; 9
    (get-application-name tt)     ; 10
    (get-db-file-name tt)         ; 11
    (get-vector-name tt)          ; 12
    (get-compute-op&field tt)     ; 13
```

```
          (get-compute-p tt)         ; 14
          (get-inverted-items tt)    ; 15
          (get-boxed-items tt)       ; 16
          (view-position tt)         ; 17
 5        (view-size tt)             ; 18
       ))

;; This portion of code is called by another application (other than TableTop,
10     ;; in this example) to pass a vector to TableTop. This portion of the code
       ;; obtains the model database name from the vector and determines if a
       ;; window is open which contains that database. If a window is not open, this
       ;; code opens the window. This code then calls the code immediately below.

15     (defmethod set-vector ((foo t) vector &optional rect)
          (set-vector (cond ((db-name-to-db-object (get-model-name-from-vector
       vector)))
                            ((open-db
                               (model-name-to-path-name (get-model-name-from-vector
20     vector))
                             'my-db)))
                      vector rect))

25     ;; This portion of code locates the window having the database and then
       ;; calls the code directly below.

(defmethod set-vector ((db *database) vector &optional rect)
          (set-vector (cond ((find-window-for-vectoring db))
30                          ((new-tt-window db 'my-tt-window rect)))
                      vector))

;; This portion of the code use the parameters in the vector (TableTop
35     ;; parameters, in the example) to display the version corresponding to the
       ;; vector.

(defmethod set-vector ((tt *tt-window) vector &optional ignore)
          (declare (ignore ignore))
40        (let ((view-type (second vector))
                (labels-p (labels-shown-p tt))
                (position (seventeenth vector))
                (size (eighteenth vector)))
             (without-interrupts
45           (if position
```

```
          (set-view-position tt position))
        (if (and size (not (equal size (view-size tt))))
          (set-view-size tt size))
        (set-view-constraint tt (first vector))
        (set-view-type tt view-type)
        (case view-type
          (axes
            (set-x-axis tt (third vector))
            (set-y-axis tt (fourth vector)))
          (venn
            (set-venn-spec-list tt (fifth vector))
            (set-selected-venn-list tt (sixth vector))))
        (set-label tt (eighth vector))
        (if (ninth vector)
          (label-icons tt)
          (unlabel-icons tt))
        (set-compute-op&field tt (thirteenth vector))
        (set-compute-p tt (fourteenth vector))
        ;;(view-draw-contents tt)
        (set-axes-selection-list tt (seventh vector))
        (set-inverted-items tt (fifteenth vector))
        (set-boxed-items tt (sixteenth vector))
        (plot-needs-redrawing (slot-value tt 'axes-plot-view))
        ;;(view-draw-contents tt)
        )
        ;(view-draw-contents tt)
        )
        ; make sure that effected window is brought to front -eric 19-Mar-93
        (window-select tt))

;; The remainder of the code provides functionality specific to the TableTop
;; implementation (e.g., such as displaying Venn diagrams) and ancillary
;; functionality to access the computer models.

(defmethod set-view-type ((tt *tt-window) view-type)
  (when (not (eq (get-view-type tt) view-type))
    (case view-type
      (axes (axes-zap tt))
      (venn (venn-zap tt)))))

(defmethod get-venn-spec ((tt *tt-window) venn-name)
  (list
    venn-name
    (get-venn-fld tt venn-name)
```

```
      (get-venn-comp tt venn-name)
      (get-venn-value tt venn-name)))

(defmethod set-venn-spec ((tt *tt-window) venn-spec)
     (let ((venn-name (first venn-spec))
           (venn-fld (second venn-spec))
           (venn-comp (third venn-spec))
           (venn-value (fourth venn-spec)))
       (if (and (not (equal (get-venn-fld tt venn-name) venn-fld))
                (neq venn-fld nil))
           (set-venn-fld tt venn-name venn-fld))
       (if (and (not (equal (get-venn-comp tt venn-name) venn-comp))
                (neq venn-comp nil))
           (set-venn-comp tt venn-name venn-comp))
       (if (and (not (equal (get-venn-value tt venn-name) venn-value))
                (neq venn-value nil))
           (set-venn-value tt venn-name venn-value))))

(defmethod get-venn-spec-list ((tt *tt-window))
     (let ((active-venns (get-active-venns tt)))
       (mapcar #'(lambda (active-venn)
                   (get-venn-spec tt active-venn))
               active-venns)))

(defmethod open-venns ((tt *tt-window) open-venn-list)
     (let ((current-open-venn-list (get-active-venns tt)))
       (mapc #'(lambda (venn-name) (close-venn tt venn-name))
             (set-difference current-open-venn-list open-venn-list))
       (mapc #'(lambda (venn-name) (open-venn tt venn-name))
             (set-difference open-venn-list current-open-venn-list))))

(defmethod set-venn-spec-list ((tt *tt-window) venn-spec-list)
     (open-venns tt (mapcar #'car venn-spec-list))
     (mapc #'(lambda (venn-spec)
               (set-venn-spec tt venn-spec))
           venn-spec-list)
     (reposition-icons tt))

(defmethod click-venn-rgns ((tt *tt-window) venn-lists)
     (mapc #'(lambda (venn-list)
               (click-venn-rgn tt venn-list))
           venn-lists))

(defmethod set-selected-venn-list ((tt *tt-window) selected-venns)
     (let ((current-selected-venns (get-selected-venn-list tt)))
```

```
        (click-venn-rgns tt
          (set-exclusive-or selected-venns current-selected-venns :test #'equal))))

(defmethod get-db-file-name ((tt *tt-window))
 5      (let* ((db (database tt))
               (pathname (slot-value db 'fpathname))
               (filename (name db)))
          (unless pathname
            (db-save (first (blessed-windows db)))
10          (setq filename (slot-value db 'fpathname)))
          filename))

(defmethod get-application-name ((tt *tt-window))
15      (get-current-process-name))

(defmethod get-vector-name ((tt *tt-window))
        "")

20    (defun db-name-to-db-object (db-name)
        "sleazy way of finding the database object given a filename"
        (dolist (window-object (windows :class '*db-window))
          (let ((db-object (slot-value window-object 'database)))
            (if (equal (pathname-name (slot-value db-object 'fpathname))
25              db-name)
              (return db-object)))))

(defmethod find-window-for-vectoring ((db *database))
        (with-slots (dependents) db
30        (dolist (dependent dependents)
            (let ((window (first dependent)))
              (if (equal (class-name (class-of window))
                  '*tt-window)
                (return window))))))
35
      (defun model-name-to-path-name (model-name)
        (def-logical-directory "BOOT" (ccl::boot-directory))
        (def-logical-directory "MODELS" "BOOT;system
      folder:preferences:mbc:models")
40      (make-pathname :directory "MODELS;" :name model-name))

(defun get-model-name-from-vector (vector)
        (nth 10 vector))
```

APPENDIX B

HYPERCARD CODE FOR QUICKTIME SCRIPT TRACK
AND FOR VECTOR DRAG AND DROP

```
-- Code writtten in HyperCard to create the functionality of a temporal
-- scripting track for QuickTime. This makes use of the time-based callback
-- function of QuickTime.  A series of time-based callbacks are daisy chained
-- in order to execute scripts at the correct time during playback of a
-- QuickTime clip.  Scripts in this track are embedded in HyperCard buttons
-- which are referred to as pointers (Ptrs) here.  For the present invention, a
-- pointer script simply sends a set-vector to TableTop with its associated
-- vector.  This vector is embedded in in the pointer button when the pointer
-- is created, after a drag and drop from TableTop.

-- This portion of the code adds a new pointer (Hypercard button) containing
-- a vector into the scripting track at a specified time, which is determined by
-- the location on the sequence bar at which the dragged version was
-- dropped.

on addPtr ptrName,ptrNth
  set the itemdelimiter to ","
  if item ptrNth of cd fld ptrnamelist is not empty then
    play boing
    exit addPtr
  end if put the number of items in cd fld ptrnamelist + 1 into insertPt
  repeat with ptrID = 1 to the number of items in cd fld ptrnamelist
    if ptrNth < item ptrID of cd fld ptrnthlist then
      put ptrID into insertPt
      exit repeat
    end if
  end repeat
  put ptrName&"," before item insertPt of cd fld ptrnamelist
  put ptrNth&"," before item insertPt of cd fld ptrnthlist
end addPtr -- This portion of the code is used to identify the next pointer (i.e., vector) in
```

```
      -- the track when the track is played back from some point other than the
      -- beginning.

function findPtrID ptrNth
 5      put 1 into ptrID
        repeat until ptrID > the number of items in cd fld ptrnthlist¬
          or ptrNth <= item ptrID of cd fld ptrnthlist
          add 1 to ptrID
        end repeat
10      return ptrID
      end findPtrID -- This portion of the code is called after a version is dragged over and
15    -- dropped on the sequence bar. Its main functions are to set up the
      -- interface, including the placement of the icon on the sequence bar and
      -- calling addPtr to add a pointer conttaining the vector onto the track.

on newPointer ptrName,currTime
20      set lockScreen to true
        get the number of items in cd fld ptrnamelist
        choose button tool
        show cd btn template
        select cd btn template
25      doMenu "copy button"
        doMenu "paste button"
        hide cd btn template
        get the rect of cd btn bounds
        put item 1 of it into knobXMin
30      put item 3 of it into knobxMax
        put (item 2 of it + item 4 of it) div 2 into knobNewY
        put the duration of window cd fld clipname div (knobXMax-knobXMin) into¬
        multiplier
        put currTime div multiplier + knobXMin into knobNewX
35      set the name of the last cd btn to ptrName
        set the loc of the last cd btn to knobNewX,knobNewY
        choose browse tool
        addPtr ptrName,currTime
        set lockScreen to false
40    end newPointer -- This portion of the code determines the location of the next pointer (i.e.,
      -- vector) in the track once the immdediately preceding pointer has been
45    -- called. One of its functions is to set up the next call back to occur at the
```

-- time designated for the vector.

```
on ptrCallBackSetUp ptrID
    set timedCallBack of window cd fld clipname to "callBackHandler"&&¬
    item ptrID of cd fld ptrnthlist
    put ptrID into cd fld setPtrID
end ptrCallBackSetUp
```

-- This portion of the code is responsive to a call from QuickTime. It functions
-- to run the script, which could include sending the vector. This code is also
-- responsible for calling the code necessary for determining the next call
-- back.

```
on callBackHandler
    --global setPtrID,ptrNameList,lastPtrExecuted get item cd fld setPtrID of cd fld ptrnamelist
    put it into cd fld lastPtrExecuted
    if cd fld setPtrID < the number of items in cd fld ptrnamelist then
        ptrCallBackSetUp (cd fld setPtrID)+1
    end if
    send "doAction" to cd btn (cd fld lastPtrExecuted)
end callBackHandler
```

APPENDIX C

```
-- DRAG AND DROP FOR VIDEO
-- TableTop calls newDragHandler via an AppleEvent after the user
-- drags over a vector to a HyperCard window.  This initiates the
-- creation of a new vector inserted into the current time of the
-- movie that the mouse was over when it was released -- This portion of the code dispatches the original drag and drop event called
-- from the modeling application.

on newDragHandler xLoc,yLoc,vector
  doMenu getHCName()
  get getWindowContainingLoc(xLoc&","&yLoc)
  if it is not empty then
    show window it
    if there is a cd fld "text" then
      send "addTextPtr xLoc,yLoc,vector" to this card
    else
      send "newPlusRec vector" to this card
    end if
  end if
end newDragHandler -- This portion of the code is responsible for detecting the window which
-- contains the location when the drop occurred.

function getWindowContainingLoc loc
  repeat with stackID = 1 to the number of lines in stacks()
    set the itemdelimiter to ":"
    put the last item of line stackID of stacks() into windowName
    set the itemdelimiter to ","
    if loc is within the rect of window windowName then
      return windowName
    end if
  end repeat
end getWindowContainingLoc
```

```
    -- This portion of the code generates a new pointer name to be used for the
    -- embedded vector and determines the time at which the vector is
    -- embedded.

5  on newPlusRec vector
       --global clipName
       newPointer generateUniquePtrName(),(the currTime of window cd fld
    clipname)
       recordState vector,the short name of the last cd btn
10     --send "genericRecord"&&(the short name of the last cd btn) to this card
    end newPlusRec -- This portion of the code is responsible for placing the vector into the script
15  -- of the pointer.

on recordState vector,stateName
       -- attempt to factor out global applicationName
       get the script of cd btn stateName
20     put vector into line 1 of it
       set the script of cd btn stateName to it
    end recordState
```

We claim:

1. In a computer system, a method comprising the steps of:

modifying a first version of a representation of information by an application program running in the computer system to create a plurality of additional versions; and storing the difference between the first version and each of the plurality of additional versions as a plurality of difference vectors as each version is created, wherein each of the difference vectors comprises a plurality of parameters used to display a distinct representation of information by the application program, each difference vector being context independent of any other difference vector, wherein each of the plurality of difference vectors may be accessed independently of the other difference vectors, such that additional versions corresponding to difference vectors so accessed may be obtained and interacted with in a live operating environment substantially similar to an environment in which said plurality of additional versions were created.

2. The method defined in claim 1 wherein each of the plurality of difference vectors includes a first portion indicative of the differences between the additional version and the first version and a second portion indicative of the manner in which said additional version may be returned to the first version.

3. The method defined in claim 1 further comprising the step of accessing one of the plurality of additional versions by its vector independently of the vectors of any other additional versions.

4. The method defined in claim 1 further comprising the steps of:

accessing at least one of the additional versions by its vector;

placing said at least one of the additional versions into a temporal sequence, wherein the temporal sequence of versions corresponding to the accessed vectors may be played back.

5. A method of producing a communication based on a computer model using a computer system, said method comprising the steps of:

modifying a first version of a representation of information by an application program running in the computer system to create a plurality of additional versions of the computer model;

storing the difference between the first version and each of the plurality of additional versions as a plurality of difference vectors as each version is created, wherein each of the difference vectors comprises a plurality of parameters used to display a distinct representation of information by the application program, each difference vector being context independent of any other difference vector, such that each of the plurality of difference vectors may be accessed independently of the other difference vectors;

accessing at least one of the additional versions by its vector independently of the vectors of any other additional versions; and placing said at least one of the additional versions into a temporal sequence to create the communication, wherein playback of the temporal sequence of versions corresponding to the accessed vectors results in presentation of and interactions with said at least one of the additional versions in a live operating environment substantially similar to an environment in which said at least one of the additional versions were created.

6. The method defined in claim 1 wherein each of the plurality of difference vectors includes a first portion indicative of the differences between the additional version and the first version and a second portion indicative of the manner in which said additional version may be returned to the first version.

7. A method for providing communication using a computer system comprising the steps of:

modifying a first version of a representation of information by an application program running in the computer system to create a plurality of additional versions;

storing the difference between the first version and each of the plurality of additional versions as a plurality of difference vectors as each version is created, wherein each of the difference vectors comprises a plurality of parameters used to display a distinct representation of information by the application program, each difference vector being context independent of any other difference vector, such that each of the plurality of difference vectors may be accessed independently of the other difference vectors; and ordering said at least one of the additional versions into a temporal sequence, wherein playback of the temporal sequence of versions corresponding to the accessed vectors results in presentation of and interactions with said at least one of the additional versions in a live operating environment substantially similar to an environment in which said at least one of the additional versions were created.

8. The method defined in claim 7 further comprising the step of annotating the temporal sequence.

9. The method defined in claim 8 wherein the temporal sequence is annotated using an audio annotation.

10. The method defined in claim 8 wherein the temporal sequence is annotated using a video annotation.

11. The method defined in claim 8 wherein the temporal sequence is annotated using a text annotation.

12. A method of providing communication in a computer system comprising the steps of:

modifying a first version of a representation of information by an application program running in the computer system to create a plurality of additional versions;

storing the difference between the first version and each of the plurality of additional versions as a plurality of difference vectors as each version is created, wherein each of the difference vectors comprises a plurality of parameters used to display a distinct representation of information by the application program, each difference vector being context independent of any other difference vectors, such that each of the plurality of difference vectors may be accessed independently of the other difference vectors;

ordering said at least one of the additional versions into a temporal sequence to produce a communication; and replaying the temporal sequence to view the communication, such that said at least one of the additional versions is presented for interaction in a live environment substantially similar to an environment in which said at least one of the additional versions were created.

13. The method defined in claim 12 further comprising the step of interacting with the temporal sequence in the live environment.

14. The method defined in claim 13 wherein the temporal sequence may be interacted with in the live environment while the temporal sequence is being replayed.

15. The method defined in claim 12 wherein the step of ordering comprises the steps of:

selecting said at least one of the plurality of additional versions;

creating a vector for each of said at least one of the plurality of additional versions, such that at least one vector is generated for said at least one of the plurality of versions; and placing said at least one of the plurality of vectors into a temporal sequence, such that the version corresponding to each of said at least one of the plurality of vectors is displayed when encountered during the replaying of the temporal sequence.

16. The method defined in claim 15 wherein the step of creating a vector includes creating a first portion indicative of the differences between the additional version and the first version and a second portion indicative of the manner in which said additional version may be returned to the first version.

17. A method for providing communication in a computer system comprising the steps of:

modifying a first version of a representation of information by an application program running in the computer system to create a plurality of additional versions;

storing the difference between the first version and each of the plurality of additional versions as a plurality of context independent and independently accessible difference vectors as each version is created, wherein each of the difference vectors comprises a plurality of parameters used to display a distinct representation of information by the application program;

selecting said at least one of the plurality of additional versions;

creating a vector for each of said at least one of the plurality of additional versions, such that at least one vector is generated for said at least one of the plurality of versions;

ordering said at least one of the additional versions into a temporal sequence to produce a communication; and replaying the temporal sequence to view the communication, such that said at least one of the additional versions is presented for interactions in a live environment substantially similar to an environment in which said at least one of the additional versions were created.

18. A computer system for providing a communication comprising:

processing means for modifying a first version of a representation of information by an application program running therein to create a plurality of additional versions;

a first storage means coupled to the processing means for storing the plurality of additional versions as a plurality of difference vectors as each version is created, wherein each of the difference vectors comprises a plurality of parameters used to display a distinct representation of information by the application program;

means coupled to the first storage means for ordering at least one of the plurality of versions into a temporal sequence, such that a communication is produced;

means for replaying the temporal sequence to view the communication, wherein the means for replaying is coupled to the means for ordering, wherein said at least one of the additional versions is presented in the application environment during replaying for manipulation therein.

19. The computer system defined in claim 18 further comprising means for interacting with the temporal sequence after the temporal sequence has begun being replayed.

20. The computer system as defined in claim 18 wherein the means for ordering comprises:

means for selecting said at least one of the plurality of additional versions;

means for determining the difference between the first version and each of the plurality of additional versions as a plurality of difference vectors, each of which is context independent of any other difference vector, such that each of the plurality of difference vectors may be accessed independently of the other difference vectors; and means for placing said at least one of the plurality of vectors into a temporal sequence, wherein the means for placing is coupled to the means for determining, such that the version corresponding to each of said at least one of the plurality of vectors is displayed when encountered during the replaying of the temporal sequence.

21. A computer system comprising:

a bus;

a processor coupled to the bus and running a representation of information by an application program running in the computer system to create a plurality of additional versions of the computer model; and a first storage coupled to the processor storing the difference between the first version as each version is created and each of the plurality of additional versions as a plurality of difference vectors, wherein each of the difference vectors comprises a plurality of parameters used to display a distinct representation of information by the application program, each difference vector being context independent of any other difference vector, wherein each of the plurality of difference vectors may be accessed independently of the other difference vectors, such that additional versions corresponding to difference vectors so accessed may be obtained and interacted with a live operating environment substantially similar to an environment in which said plurality of additional version were created.

22. The computer system defined in claim 21 wherein said plurality of vectors are stored immediately after their creation.

23. The computer system defined in claim 21 wherein each of the plurality of difference vectors includes a first portion indicative of the differences between the additional version and the first version and a second portion indicative of the manner in which said additional version may be returned to the first version.

24. The computer system defined in claim 21 further comprising the means for accessing one of the plurality of additional versions by its vector independently of the vectors of any other additional versions.

25. The computer system defined in claim 21 further comprising:

means for accessing at least one of the additional versions by its vector;

means coupled to the means for accessing for placing said at least one of the additional versions into a temporal sequence, wherein the temporal sequence of versions corresponding to the accessed vectors may be played back.

26. A computer system that produces a communication based on a computer model, said computer system comprising:

a bus;

an execution environment running a representation of information by an application program running in the computer system to create a plurality of additional versions of the computer model;

a capture mechanism coupled to the execution environment to capture the plurality of additional versions;

a storage coupled to the capture mechanism storing the difference between the first version and each of the plurality of additional versions as a plurality of difference vectors as each version is created, wherein each of the difference vectors comprises a plurality of parameters used to display a distinct representation of information by the application program, each difference vector being context independent of any other difference vector, such that each of the plurality of difference vectors may be accessed independently of the other difference vectors;

wherein the execution environment accesses the storage to obtain at least one of the additional versions by its vector independently of the vectors of any other additional versions and orders said at least one of the additional versions into a temporal sequence, wherein playback of the temporal sequence of versions corresponding to the accessed vectors results in presentation of and interaction with said at least one of the additional versions in a live operating environment substantially similar to an environment in which said at least one of the additional versions were created.

* * * * *